United States Patent [19]

Schibbye

[11] E Re. 30,869

[45] Reissued Feb. 23, 1982

[54] METHOD OF OPERATING A REFRIGERATION PLANT AND A PLANT FOR PERFORMING THE METHOD

[75] Inventor: Lauritz B. Schibbye, Algvagen, Sweden

[73] Assignee: Svenska Rotor Maskiner Aktiebolag, Nacka, Sweden

[21] Appl. No.: 82,422

[22] Filed: Oct. 5, 1979

Related U.S. Patent Documents

Reissue of:

[64] Patent No.: 3,811,291
Issued: May 21, 1974
Appl. No.: 314,993
Filed: Dec. 14, 1972

[30] Foreign Application Priority Data

Dec. 28, 1971 [GB] United Kingdom ..... 60274/71

[51] Int. Cl.[3] ..... F25B 43/02

[52] U.S. Cl. ..... 62/192; 62/84; 62/468; 62/470; 62/473; 62/505

[58] Field of Search ..... 62/197, 505, 196, 222, 62/193, 468, 469, 470, 471, 201, 117, 149, 127

[56] References Cited

U.S. PATENT DOCUMENTS

| | | | |
|---|---|---|---|
| 2,739,450 | 3/1956 | Breck | 62/193 |
| 3,062,020 | 11/1962 | Heidorn | 62/193 |
| 3,165,681 | 1/1965 | Pinckaers | 236/78 C X |
| 3,379,033 | 4/1968 | Grant | 62/84 |
| 3,408,826 | 11/1968 | Soumerai | 62/193 |
| 3,408,828 | 11/1968 | Soumerai | 62/470 |
| 3,791,165 | 2/1974 | Honnold, Jr. et al. | 62/149 |

FOREIGN PATENT DOCUMENTS 1287309 10/1970 United Kingdom .

*Primary Examiner*—William E. Wayner
*Attorney, Agent, or Firm*—Frishauf, Holtz, Goodman & Woodward

[57] ABSTRACT

A refrigeration plant including an oil-injected compressor, an oil separator, a condenser and an evaporator. The plant comprises means to introduce liquid refrigerant to the compression phase of the cycle ahead of the oil separator. The plant further comprises means to adjust the amount of liquid refrigerant introduced in response to the temperature difference between the condenser and the oil separator, in order to keep the difference on a constant level of 5° C. to 15° C.

7 Claims, 4 Drawing Figures

METHOD OF OPERATING A REFRIGERATION PLANT AND A PLANT FOR PERFORMING THE METHOD

Matter enclosed in heavy brackets [ ] appears in the original patent but forms no part of this reissue specification; matter printed in italics indicates the additions made by reissue.

The present invention relates to refrigeration plants comprising a refrigerant flow circuit including a compressor of the screw rotor type, a condenser and an evaporator and more praticularly to such plants which also include means for circulating oil and for passing said oil through the compressor and having an oil separator provided in said circuit between the outlet of the compressor and the inlet of the condenser.

In refrigeration plants of this kind the oil is injected into the compression chambers of the compressor in order to cool the gaseous refrigerant during the compression and to seal the clearances at the intermesh between the rotors and at the periphery and end planes of the rotors. Further, in compressors having non-synchronized rotors the oil also serves to lubricate the rotors.

After having passed the compressor the oil has a rather high temperature and therefore it must be cooled before it is again injected into the compressor. Hitherto this cooling has usually been effected in an oil cooler using for instance water as a cooling agent. Due to the fact that there are large heat quantities to be removed from the oil these oil coolers become rather bulky. Further, when the refrigerant consists of ammonia the cooler must be made from steel which renders it expensive to manufacture.

It has previously been suggested to use liquid refrigerant as a cooling agent by introducing it into the compressor of a refrigeration plant. Some of these known proposals represent attempts to attain the desired cooling of the compressed gas without using oil while other are intended to solve specific problems in the operation of certain types of refrigerant compressors. However, liquid refrigerant has very poor sealing and lubricating properties and therefore the replacement of oil by liquid refrigerant in screw rotor compressors has not been successful.

The invention has for its object to provide a refrigeration plant of the type described in the introductory paragraph of this specification and further comprising means for introducing liquid refrigerant into a circuit portion between the inlet of the compressor and the inlet of the oil cooler, and a method of operating such a plant. According to this method the introduction of the liquid refrigerant is controlled such that the temperature in the oil separator is kept at a level only slightly above the liquefaction temperature of the refrigerant at the pressure prevailing in the oil separator but is prevented from falling to said liquefaction temperature.

SUMMARY OF THE INVENTION

The plant according to the invention is characterized by means responsive to at least one parameter indicative of the difference between the temperature in the oil separator and the temperature in the condenser, adjustable means for varying the quantity of liquid refrigerant introduced into said circuit portion, and means connecting said responsive means with said adjustable means to control said adjustable means such that the temperature difference is kept small but is prevented from dropping down to zero.

The oil must be removed from the gas before the gas enters the condenser because oil entrained by the gaseous refrigerant will eventually accumulate in the evaporator. On the other hand, if liquid refrigerant is separated from the gaseous refrigerant in the oil separator together with the oil this will cause severe disturbances and even failure of the whole plant due to evaporation of the liquid refrigerant within the oil pump and in the bearings of the screw rotor compressor which are pressure lubricated by part of the oil passing through the pump. Due to the high operating pressures of refrigerant compressors and the relatively small distance between the rotor shafts the radial bearings must be of the plain bearing type and therefore require perfect lubrication.

For the above reasons the gas must be prevented from condensing in the oil separator. On the other hand it is desirable to decrease the temperature of the oil as much as possible in order to increase the cooling effect of the oil when injected into the compressor. The invention makes it possible to attain a desired low oil temperature without the use of a separate oil cooler while obviating the risk of condensing of the gaseous refrigerant within the oil separator.

The invention will now be described more in detail with reference to the accompanying drawing in which FIG. 1 diagrammatically illustrates an embodiment of a refrigeration plant according to the invention;

DETAILED DESCRIPTION OF ILLUSTRATED EMBODIMENTS

Figure 1:
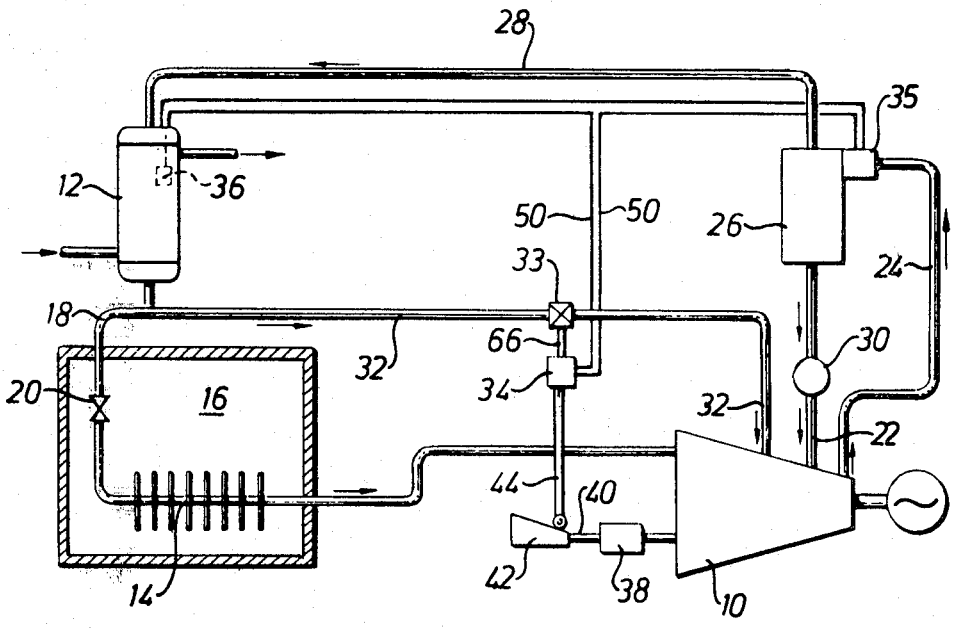

The refrigeration plant shown comprises a refrigerant flow circuit which includes a compressor 10 of the screw rotor type, a condenser 12 and an evaporator 14. In the embodiment shown the condenser 12 is of the type in which the refrigerant passes through straight tubes extending between headers at the ends of a preferably cylindrical jacket which surrounds the tubes and through which cooling water is circulated in a known manner. The evaporator 14 is provided in a refrigerating chamber 16 and liquid refrigerant is supplied to the evaporator through a conduit 18 and via an expansion valve 20 which is controlled in a known manner in response to the temperature in the refrigerating chamber 16.

The compressor 10 may be of substantially the same type as shown in U.S. Pat. No. 3,432,089. Thus, oil from a supply conduit 22 is injected into the compression chambers of the compressor for sealing and cooling purposes and leaves the compressor together with the vapourous refrigerant through a conduit 24 leading to an oil separator 26 of suitable type. The oil-free high pressure refrigerant vapour flows through a conduit 28 to the condenser 12 where it condenses while the oil is removed from the oil separator 26 by a pump 30 and delivered to the conduit 22 which forms the discharge conduit of the pump.

According to the invention there is provided a conduit 32 between the outlet of the condenser 12 and the compressor 10. In the compressor 10 there is provided at least one nozzle which is connected to said conduit 32 and located such as to inject liquid refrigerant into the compression chambers of the compressor before the pressure in said chambers has reached the discharge pressure of the compressor. In this manner the pressure of the liquid refrigerant will be sufficient for injecting the refrigerant into the compression chambers against the pressure prevailing in said chambers during this stage of the compression.

In the conduit 32 there is provided a metering valve 33 adjustable by means of an operating device 34. This device 34 is controlled by a thermocouple having one joint 35 located at the inlet of the oil separator 26 and exposed to the temperature of the compressed fluid entering the separator and a second joint 36 located within the condenser 12. The operating device 34 contains means for transforming the current produced by the thermocouple into adjustment forces for actuating the valve 33 such that at increasing temperature difference between the joints 35 and 36 the valve 33 is actuated in an opening direction and at decreasing temperature difference in a closing direction. In this manner it is possible to maintain the temperature difference substantially constant and at a value of about for instance 5° to 15° C. Thus, irrespective of the condensing temperature of the gaseous refrigerant the temperature in the oil separator 26 is slightly higher so that no liquefaction can take place in the separator. Further, the temperature of the oil leaving the separator through the conduit 22 is also always only slightly higher than the condensing temperature resulting in the best possible cooling effect when the oil is injected into the compressor.

The capacity of the compressor 10 is variable by means of a slide valve as described in U.S. Pat. No. 3,432,089, so that the temperature in the refrigerating chamber 16 may automatically be kept substantially constant in a known manner. In the embodiment shown the slide valve is adjustable by means of a hydraulic servomotor 38.

If the temperature in the refrigeration chamber 16 tends to sink below the desired predetermined value the slide valve is moved to decrease the capacity of the compressor. This reduction of the capacity involves a reduction of the compression work and consequently also of the demand for cooling. However, the speed of the oil pump 30 is not changed and therefore the injected oil quantity remains unchanged. Further, at partial capacity the counter pressure in the compressor at the condensate injection point is lower than the pressure at full capacity and therefore the injected condensate quantity is at first increased. For these reasons the discharge temperature of the compressor will at first decrease before the pressure in the high pressure portion of the cirquit has assumed the somewhat lower value which will be the result of the reduced capacity of the compressor. It is evident that in this way there is a risk that the temperature in the oil separator 26 may temporarily sink down to the condensing temperature.

In order to eliminate this risk the piston rod 40 of the servo-motor 38 extends out through the end of the servo-motor remote from the compressor. The projecting outer portion of the piston rod carries a cam 42 cooperating with a cam follower 44 operatively connected to the operating device 34. When the cam 42 moves rightwards from the position shown in FIG. 1 and corresponding to the full capacity position of the slide valve as the slide valve is adjusted towards a partial capacity position the cam follower 44 actuates the operating device 34 to bring this device to adjust the metering valve 33 in a closing direction so that the injected condensate quantity is decreased.

The cam 42 may be shaped such that for each position of the slide valve the cam determines a preliminary specific setting of the metering valve 33 in which the supply of condensate to the compressor is sufficient to keep the temperature of the compressed gas at a level higher than the liquefaction or condensing temperature of the gaseous refrigerant at the pressure prevailing in the high pressure portion of the circuit when the plant operates under steady state condition at the actual position of the slide valve. It is to be noted that the drawbacks associated with an unnecessarily high temperature in the oil separator are smaller than those resulting from condensing and therefore the metering valve 33 is governed such that at all changes of the capacity of the compressor the temperature in the oil separator is well above the condensing temperature during the transition periods between different compressor capacities. Once a steady state condition is reached the thermocouple 35, 36 and the operating device 34 ascertain that the temperature in the oil separator 26 is only 5° to 15° C. higher than the condensing temperature.

Figure 2:
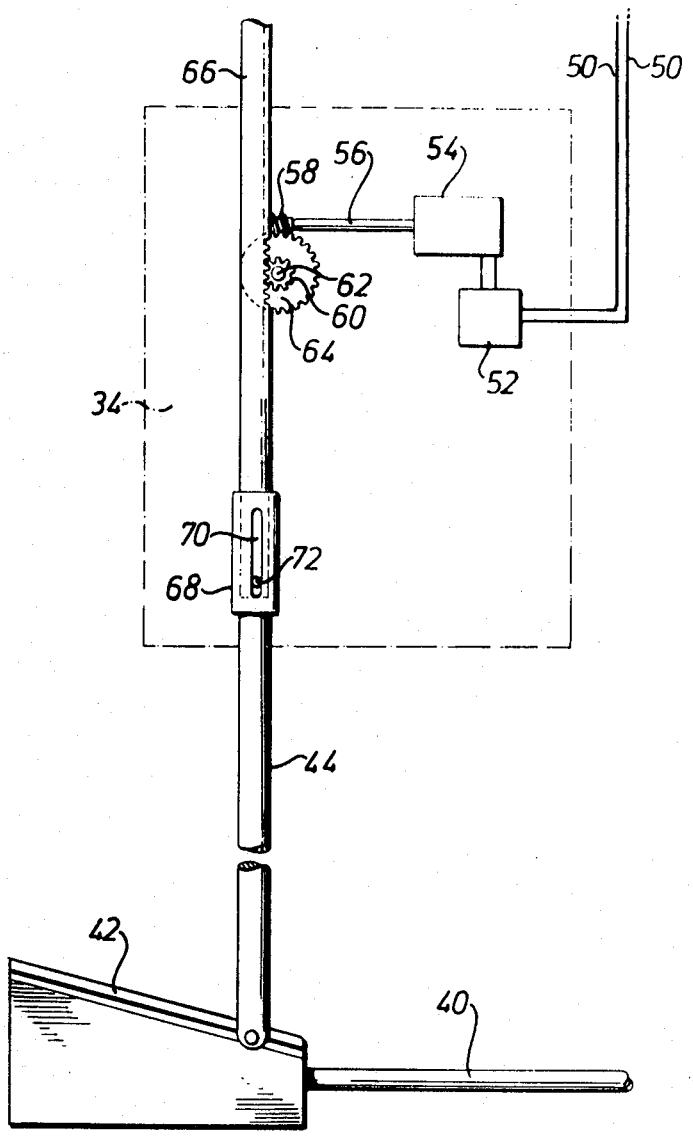
FIG. 2 is a detailed view of operating means included in the plant according to FIG. 1.

The operating device 34 is shown in detail but diagramatically in FIG. 2. According to this Figure the two conduits 50 from the thermocouple 35, 36 are connected to a control device 52 which is adapted to supply current to an electric motor 54 to drive this motor in either direction in response to signals received from the thermocouple. The shaft 56 of the motor carries a worm 58 engaging a worm wheel 60 mounted on a shaft 62 perpendicular to the motor shaft 56. Also mounted on the shaft 62 is a spur gear 64 which is drivingly connected to the worm wheel 60 via a slip coupling (not shown) and meshes with a rack 66. This rack 66 is adapted to actuate the metering valve 33.

At its upper end the cam follower 44 is provided with a head member 68 having a longitudinal slot 70 slidingly receiving a pin 72 mounted at the lower end of the rack 66.

In the Figures the cam 42 is shown in a position corresponding to full capacity of the compressor 10. In this position the pin 72 is located at a small distance from the lower end of the slot so that the rack 66 is free to move in the slot 70 in both directions in response to signals from the thermocouple 35, 36 for fine adjustment of the metering valve 33 during the steady state condition.

When the slide valve of the compressor is adjusted rightward towards a partial capacity position the cam follower 44 is raised and pushes the rack 66 upwardly. Such movement of the rack 66 is possible due to the action of the slip coupling between the spur gear 64 and the worm wheel 60.

When the rack 66 moves upwardly the metering valve 33 is successively throttled so that the quantity of injected liquid refrigerant is decreased substantially in proportion to the decreasing compression work of the compressor. In this manner the temperature of the compressed fluid is prevented from falling down to the condensation temperature during the adjustment movement of the slide valve of the compressor. When the temperature in the refrigerating chamber 16 approaches the desired predetermined value the slide valve is slowed down and stopped and the thermocouple 35, 36 takes the control of metering valve 33 for fine adjustment of the temperature in the oil separator in relation to the temperature in the condenser. During steady state conditions at the partial load thus attained, the pin 72 is located near the lower end of the slot 70.

When later on the temperature in the refrigerating chamber 16 tends to rise the slide valve is caused to move towards the full capacity position and the cam follower 44 is pulled downwardly. This downward movement takes place without the rack 66 being actuated because the slot 70 can move downwardly relatively to the pin 72. Therefore, the metering valve 33 remains in its partly throttled position until the thermocouple 35, 36 responds to the increasing temperature and causes the motor 54 to actuate the valve 33 in an opening direction.

Figure 3:
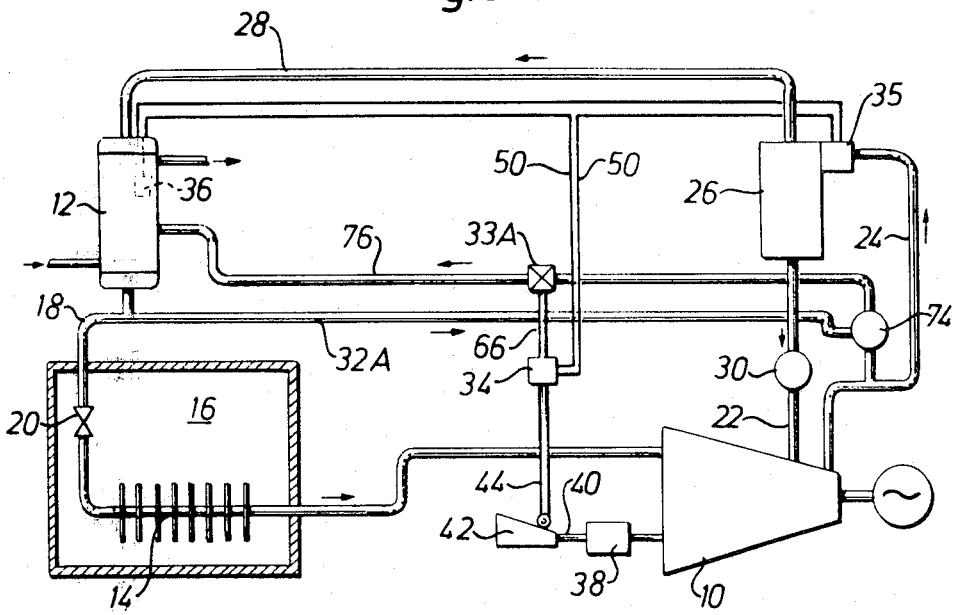
FIG. 3 is a modification of FIG. 1.

In FIG. 3 is illustrated a modification of the control device just described. According to this modification the liquid refrigerant is injected into the discharge conduit 24 of the compressor where the pressure is somewhat higher than the pressure in the condenser 12. For this reason there is provided a pump 74 to which the liquid refrigerant from the condenser is supplied through a conduit 32A. The pump 74 is of the type having a non-return valve in its outlet and means for bypassing a variable liquid quantity which is returned to the condenser 12 through a conduit 76. In this conduit 76 is provided a valve 33A adapted to be operated by a device similar to the device 34 described above. However, in order to decrease the injected refrigerant quantity the valve 33A is actuated in an opening direction, the maximum quantity being attained when the valve 33A is fully closed.

Figure 4:
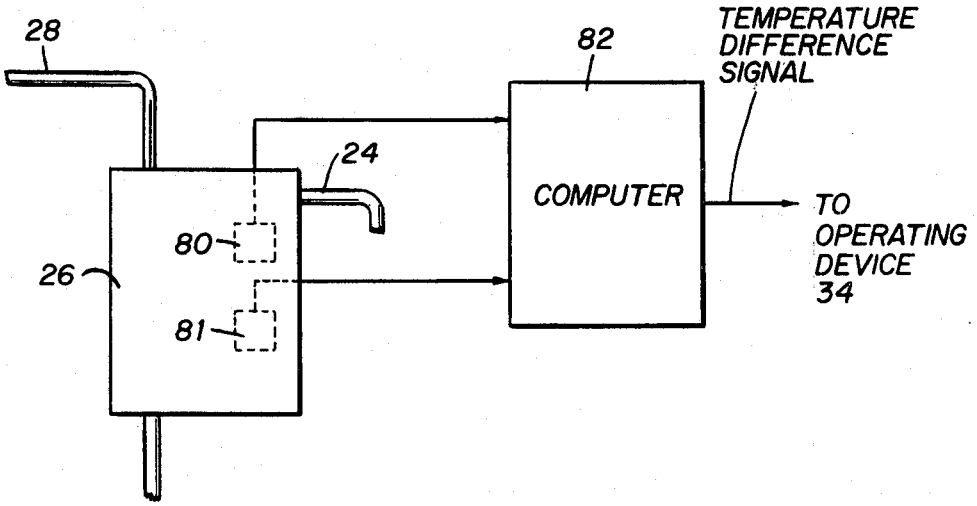
FIG. 4 is a further modification of the invention.

As shown in FIG. 4, since the liquefaction or condensing temperature of a gas varies with its pressure the thermocouple 35, 36 may be replaced by a temperature sensing device 80 and a pressure sensing device 81 provided in the oil separator 26. These devices may be connected to a computer 82 adapted to produce a signal representing the difference between the temperature in the oil separator and the liquefaction temperature of the refrigerant at the pressure prevailing in the oil separator, this signal being used to control the supply of cooling liquid refrigerant.

I claim:

[1. A method of operating a refrigeration plant comprising: a refrigerant flow circuit including a compressor of the screw rotor type, a condenser and an evaporator; means for circulating oil and for injecting said oil into the compression chambers of said compressor; an oil separator provided in said circuit between the outlet of said compressor and the inlet of said condenser; and means for introducing liquid refrigerant into a circuit portion between the inlet of the compressor and the inlet of said oil separator;

comprising controlling the introduction of the liquid refrigerant into said circuit portion such that the temperature in the oil separator is kept at a level only slightly above the liquefaction temperature of the refrigerant at the pressure prevailing in the oil separator but is prevented from falling to said liquefaction temperature.]

[2. A method as defined in claim 1, comprising keeping the temperature in the oil separator at a temperature level which is 5° C. to 15° C. higher than said liquefaction temperature.]

3. A refrigeration plant comprising:

a refrigerant flow circuit including a compressor of the screw rotor type, a condenser and an evaporator;

means for circulating oil and for injecting said oil into the compression chambers of said compressor;

an oil separator provided in said circuit between the outlet of said compressor and the inlet of said condenser;

means for introducing liquid refrigerant into a circuit portion between the inlet of the compressor and the inlet of said oil [seperator] *separator;* means responsive to at least one parameter indicative of the difference between the temperature in the oil separator and the temperature in the condenser;

adjustable means for varying the quantity of liquid refrigerant introduced into said circuit portion; [and]

*means for controlling the capacity of the compressor, said capacity controlling means being operatively connected to said adjustable means to reduce the quantity of liquid refrigerant introduced during operation at partial capacity; and* means connecting said responsive means with said adjustable means to control said adjustable means such that said temperature difference is kept small but is prevented from dropping down to zero.

[4. A plant as defined in claim 3, comprising means for controlling the capacity of the compressor, said capacity controlling means being operatively connected to said adjustable means to reduce the quantity of liquid refrigerant introduced during operation at partial capacity.]

[5. A plant as defined in claim 3, wherein said responsive means includes a temperature sensing device in each of the condenser and the oil separator, said sensing devices being combined to produce a signal representing said temperature difference, said connecting means controlling said adjustable means as a function of said signal to keep said difference substantially constant.]

[6. A plant as defined in claim 3 wherein said responsive means includes a temperature sensing device and a pressure sensing device coupled to said oil separator, said devices being connected to a computer for producing a signal representing the difference between the temperature in the oil separator and the liquefaction temperature of the refrigerant at the pressure prevailing in the oil separator.]

[7. A plant according to claim 3 wherein said connecting means controls said adjustable means such that said temperature in the oil separator is about 5° C. to 15° C. higher than the temperature in said condenser.]

[8. A plant according to claim 3 wherein said liquid refrigerant is introduced into the compression chambers of said compressor and said adjustable means comprises a valve means coupled in the path of said liquid refrigerant to said compressor, said valve means being opened to increase the quantity of said liquid refrigerant introduced into said compressor.]

[9. A plant according to claim 3 wherein said liquid refrigerant is introduced into a discharge conduit of said compressor and including return conduit means returning liquid refrigerant to said condenser, said adjustable means comprising a valve means in said return conduit, said valve means being closed to increase the quantity of liquid refrigerant introduced into said discharge conduit of said compressor.]

10. A plant according to claim [4] *3* wherein said connecting means comprises a motor coupled to said adjustable means via a gear mechanism, said capacity controlling means also being coupled to said adjustable means via said gear mechanism.

11. A plant according to claim [4] *3* wherein said controlling means includes a cam arrangement operatively coupled to said adjustable means.

12. A plant according to claim [5] *3* wherein said connecting means comprises a motor coupled to said adjustable means via a gear mechanism.

13. A plant according to claim [6] *3* wherein said temperature sensing and pressure sensing devices are in said oil separator.

[14. A method as defined in claim 1 comprising controlling the introduction of said liquid refrigerant into the compression chambers of said compressor.]

15. A [method] *plant* according to claim [1 comprising controlling the introduction of said liquid refrigerant into] *16, wherein said introducing means communicates with* a discharge conduit of said compressor.

*16. A refrigeration plant comprising:*

*a refrigerant flow circuit including a compressor of the screw rotor type, a condenser and an evaporator, said compressor having a discharge conduit;*

*means for circulating oil and for injecting said oil into the compression chambers of said compressor;*

*an oil separator provided in said circuit between the outlet of said compressor and the inlet of said condenser;*

*means for introducing liquid refrigerant into said discharge conduit of said compressor at a position between said compressor and the inlet of said oil separator;*

*return conduit means returning liquid refrigerant to said condenser;*

*means responsive to at least one parameter indicative of the difference between the temperature in the oil separator and the temperature in the condenser;*

*adjustable valve means in said return conduit means for varying the quantity of liquid refrigerant introduced into said discharge conduit of said compressor, said valve means being closed to increase the quantity of liquid refrigerant introduced into said discharge conduit of said compressor; and*

*means connecting said responsive means with said adjustable valve means to control said adjustable valve means such that said temperature difference is kept small but is prevented from dropping down to zero.*

* * * * *